(12) United States Patent
Hald et al.

(10) Patent No.: US 10,865,774 B2
(45) Date of Patent: Dec. 15, 2020

(54) WIND TURBINE CONTROL METHOD AND SYSTEM

(71) Applicant: MHI VESTAS OFFSHORE WIND A/S, Aarhus N (DK)

(72) Inventors: Tue Hald, Hadsten (DK); Alex Pericleous, Surrey (GB); Henrik Bæk Jørgensen, Odder (DK)

(73) Assignee: MHI VESTAS OFFSHORE A/S, Aarhus N (DK)

( * ) Notice: Subject to any disclaimer, the term of this patent is extended or adjusted under 35 U.S.C. 154(b) by 0 days.

(21) Appl. No.: 16/323,117

(22) PCT Filed: Jun. 15, 2017

(86) PCT No.: PCT/DK2017/050200
§ 371 (c)(1),
(2) Date: Feb. 4, 2019

(87) PCT Pub. No.: WO2018/028753
PCT Pub. Date: Feb. 15, 2018

(65) Prior Publication Data
US 2019/0170120 A1 Jun. 6, 2019

(30) Foreign Application Priority Data
Aug. 9, 2016 (DK) .................................. 2016 70600

(51) Int. Cl.
*F03D 7/04* (2006.01)
*H02J 3/38* (2006.01)
(Continued)

(52) U.S. Cl.
CPC ............. *F03D 7/048* (2013.01); *F03D 7/028* (2013.01); *F03D 7/0284* (2013.01); *F03D 9/257* (2017.02);
(Continued)

(58) Field of Classification Search
CPC ........ F03D 7/028; F03D 7/0284; F03D 7/048; F03D 9/257; F03D 1/00; F05B 2220/30;
(Continued)

(56) References Cited

U.S. PATENT DOCUMENTS 3,940,687 A * 2/1976 Akhundov ................ G05F 1/66
323/205
5,974,403 A * 10/1999 Takriti .................... G06Q 10/06
705/412

(Continued)

FOREIGN PATENT DOCUMENTS

EP 2093420 A2 8/2009
EP 2876768 A1 5/2015
(Continued)

OTHER PUBLICATIONS

Danish Patent and Trademark Office First Technical Examination for Application No. PA 2016 70600 dated Feb. 1, 2017.
(Continued)

*Primary Examiner* — Pedro J Cuevas
(74) *Attorney, Agent, or Firm* — Patterson + Sheridan, LLP

(57) ABSTRACT

A method for controlling a wind power plant including a plurality of wind turbines that provide output power through a transmission line arrangement, wherein each wind turbine in the wind power plant has a nominal power limit setting. The method comprises determining spare capacity on the transmission line arrangement; and configuring one or more of the wind turbines in dependence on the determined spare capacity, such that said wind turbines are operable to exceed their respective nominal power limit setting in order to exploit the spare capacity on the transmission line arrangement. Aspects of the invention also relate to a power plant controller configured to implement the method.

19 Claims, 5 Drawing Sheets

(51) Int. Cl.
*F03D 9/25* (2016.01)
*F03D 7/02* (2006.01)
*F03D 1/00* (2006.01)

(52) U.S. Cl.
CPC ............... *H02J 3/386* (2013.01); *F03D 1/00* (2013.01); *F05B 2220/30* (2013.01); *F05B 2260/40* (2013.01); *F05B 2260/80* (2013.01); *F05B 2270/1033* (2013.01); *F05B 2270/332* (2013.01); *F05B 2270/335* (2013.01); *F05B 2270/337* (2013.01); *F05B 2270/402* (2013.01); *Y02E 10/723* (2013.01); *Y02E 10/725* (2013.01); *Y02E 10/763* (2013.01)

(58) Field of Classification Search
CPC .............. F05B 2260/40; F05B 2260/80; F05B 2270/1033; F05B 2270/332; F05B 2270/335; F05B 2270/337; F05B 2270/402
USPC ........................................................ 290/44, 55
See application file for complete search history.

(56) References Cited

U.S. PATENT DOCUMENTS

| | | | | |
|---|---|---|---|---|
| 7,133,359 | B2* | 11/2006 | Weis | H04L 41/0663 370/222 |
| 7,667,343 | B2* | 2/2010 | Oohara | H02P 9/00 290/44 |
| 8,121,079 | B2* | 2/2012 | Geng | H04B 7/022 370/329 |
| 8,306,671 | B1* | 11/2012 | Marcus | H02J 3/28 700/295 |
| 8,311,681 | B1* | 11/2012 | Marcus | G06Q 30/0202 700/295 |
| 8,319,358 | B2* | 11/2012 | Curry | B60L 8/00 290/1 A |
| 8,457,800 | B2* | 6/2013 | Marcus | G05F 1/66 700/286 |
| 8,649,911 | B2 | 2/2014 | Avagliano et al. | |
| 8,738,191 | B2* | 5/2014 | Aivaliotis | H02J 3/00 700/286 |
| 8,965,594 | B2* | 2/2015 | Marcus | G06Q 40/04 700/295 |
| 9,018,782 | B2* | 4/2015 | Couchman | F03D 7/028 290/44 |
| 9,163,611 | B2* | 10/2015 | Santiago Benito | F03D 7/0224 |
| 9,263,213 | B2* | 2/2016 | Mori | H01H 9/563 |
| 9,811,061 | B1* | 11/2017 | Hu | H02J 3/004 |
| 9,825,462 | B2* | 11/2017 | Yamagaki | H02J 3/38 |
| 9,991,718 | B2* | 6/2018 | Kobayashi | H02J 3/46 |
| 10,103,575 | B2* | 10/2018 | Satoh | H02J 3/06 |
| 10,127,568 | B2* | 11/2018 | Forbes | G06Q 30/0202 |
| 10,193,339 | B2* | 1/2019 | Ichino | G05B 15/02 |
| 10,480,485 | B2* | 11/2019 | Hales | F03D 7/028 |
| 10,516,265 | B2* | 12/2019 | Hu | H02J 3/004 |
| 10,541,433 | B2* | 1/2020 | Patel | H02J 3/38 |
| 10,557,456 | B2* | 2/2020 | Kjær | F03D 1/0675 |
| 10,570,882 | B2* | 2/2020 | Hardwicke, Jr. | F03D 7/0272 |
| 10,574,430 | B2* | 2/2020 | Hisano | H04L 5/1423 |
| 10,707,958 | B2* | 7/2020 | Searcy | H04B 10/0731 |
| 2003/0182250 | A1* | 9/2003 | Shihidehpour | G06Q 10/04 706/21 |
| 2007/0216165 | A1* | 9/2007 | Oohara | F03D 9/00 290/44 |
| 2008/0033786 | A1* | 2/2008 | Boaz | G06Q 10/06375 705/7.31 |
| 2008/0069058 | A1* | 3/2008 | Geng | H04W 52/42 370/336 |
| 2009/0093916 | A1* | 4/2009 | Parsonnet | G05B 15/02 700/286 |
| 2009/0212563 | A1 | 8/2009 | Morjaria | |
| 2010/0006356 | A1* | 1/2010 | Curry | B60L 8/00 180/65.8 |
| 2010/0100250 | A1* | 4/2010 | Budhraja | H02J 13/00001 700/291 |
| 2010/0292856 | A1* | 11/2010 | Fujita | G06Q 10/06 700/291 |
| 2011/0049903 | A1* | 3/2011 | Jorgensen | H02J 3/386 290/55 |
| 2011/0153386 | A1* | 6/2011 | Kim | G06Q 30/0202 705/7.31 |
| 2012/0133138 | A1 | 5/2012 | Sorensen et al. | |
| 2012/0179301 | A1* | 7/2012 | Aivaliotis | H02J 3/00 700/286 |
| 2013/0066600 | A1* | 3/2013 | Rousselle | H02J 3/00 703/1 |
| 2013/0221760 | A1* | 8/2013 | Mori | H01H 35/00 307/130 |
| 2013/0257051 | A1* | 10/2013 | Spruce | F03D 7/028 290/44 |
| 2013/0270827 | A1* | 10/2013 | Couchman | F03D 7/028 290/44 |
| 2014/0246856 | A1* | 9/2014 | Santiago Benito | F03D 7/0224 290/44 |
| 2014/0284926 | A1* | 9/2014 | Tirumalai | F03D 7/0204 290/44 |
| 2015/0032397 | A1* | 1/2015 | Mai | H02J 3/06 702/65 |
| 2015/0155710 | A1* | 6/2015 | Yamagaki | H02J 3/00 307/18 |
| 2015/0198145 | A1* | 7/2015 | Diedrichs | F03D 7/048 700/287 |
| 2015/0214737 | A1* | 7/2015 | Ichino | H02J 3/06 700/297 |
| 2015/0255986 | A1* | 9/2015 | Kobayashi | H02J 3/46 307/80 |
| 2015/0280629 | A1* | 10/2015 | Diedrichs | H02P 9/105 290/44 |
| 2016/0061189 | A1* | 3/2016 | Chen | F03D 7/0284 290/44 |
| 2017/0012467 | A1* | 1/2017 | Satoh | G05B 15/02 |
| 2017/0022972 | A1* | 1/2017 | Kjær | F03D 1/0675 |
| 2017/0248123 | A1* | 8/2017 | Hales | F03D 7/028 |
| 2018/0254498 | A1* | 9/2018 | Patel | H01M 8/04097 |
| 2018/0309563 | A1* | 10/2018 | Hisano | H04L 5/1423 |
| 2018/0356105 | A1* | 12/2018 | Gu | H02J 3/46 |
| 2019/0145376 | A1* | 5/2019 | Hardwicke, Jr. | H02J 3/38 700/287 |
| 2019/0392534 | A1* | 12/2019 | Takeuchi | H02J 13/00 |
| 2020/0059178 | A1* | 2/2020 | Brombach | H02P 9/006 |
| 2020/0076501 | A1* | 3/2020 | Searcy | H04J 14/0212 |
| 2020/0080540 | A1* | 3/2020 | Baun | F03D 9/255 |
| 2020/0132048 | A1* | 4/2020 | Baun | F03D 1/02 |
| 2020/0217299 | A1* | 7/2020 | Garcia Sayes | H02J 3/38 |

FOREIGN PATENT DOCUMENTS

| | | |
|---|---|---|
| WO | 2014040601 A2 | 3/2014 |
| WO | 2016058617 A1 | 4/2016 |
| WO | 2018028753 A1 | 2/2018 |

OTHER PUBLICATIONS

PCT International Search Report for Application No. PCT/DK2017/050200 dated Sep. 21, 2017.

* cited by examiner

WIND TURBINE CONTROL METHOD AND SYSTEM

FIELD OF THE INVENTION

Aspects of the invention relates generally to a method and system for controlling a wind power plant in order to improve the energy generating efficiency of the power plant.

BACKGROUND OF THE INVENTION

A wind power plant comprises a plurality of wind turbines that are grouped together in a common geographic area and electrically coupled to a power distribution grid at a common connection point. Often, though not always, common connection point is an intermediate substation.

In the pursuit of lower energy production costs, there is a generally upwards trend towards larger wind power plants that comprise tens if not hundreds of separate wind turbines so as to make use of economies of scale in the plant infrastructure such as cabling, installation equipment and a power plant control system.

The individual wind turbines in the power plant are controlled by a power plant control system or 'controller'. Typically the power plant controller is responsible for interpreting the power demands transmitted to it by a transmission system operator and communicating power output requirements to the wind turbines under its control. All of the wind turbines in the power plant will, however, be operable up to their maximum continuous operation limit or 'rated power' setting. This means that for wind speeds at or above a rated wind speed, the wind turbines will produce a predetermined power output or 'rated power'. For dangerously elevated wind speeds, the wind turbines will be configured to curtail their output power or to shut down completely, thereby protecting their components and ensuring that the predicted operational lifetime of the wind turbines are not adversely affected.

Designing a wind power plant is a complicated process which relies on accurate predictions of the wind speed relating to the proposed site of a wind power plant. Typically the average wind speed at the proposed power plant location is the parameter that determines the rated power output of the wind turbines that will be used in the power plant. However, since the average wind speed only provides one element of the overall wind profile for a particular location, it may be the case that an opportunity is missed to fully optimize the operational capacity of the wind turbines to achieve benefits in terms of an increase in annual energy production. It is against this background that the invention has been devised.

SUMMARY OF THE INVENTION

In a first aspect, the invention provides a method for controlling a wind power plant including a plurality of wind turbines that provide output power through a transmission line arrangement, wherein each wind turbine in the wind power plant has a nominal power limit setting, wherein the method comprises:
determining spare capacity on the transmission line arrangement; and
configuring one or more of the wind turbines in dependence on the determined spare capacity, such that said wind turbines are operable to exceed their respective nominal power limit setting in order to exploit the spare capacity on the transmission line arrangement.

The invention also resides in a power plant controller for a wind power plant comprising a plurality of wind turbines that are coupled to a transmission line arrangement so as to provide output power to the transmission line arrangement, wherein the power plant controller is configured to:
determine spare capacity on the transmission line arrangement; and
configure one or more of the wind turbines in dependence on the determined spare capacity, such that said wind turbines are operable to exceed their respective nominal power limit setting in order to exploit the spare capacity on the transmission line arrangement.

Aspects of the invention may also be expressed as a controller comprising a processor, a memory module, and an input/output system, wherein the memory module includes a set of program code instructions which, when executed by the processor, implements a method as described above, and also as a computer program product downloadable from a communication network and/or stored on a machine readable medium, comprising program code instructions for implementing a method as described above, and also as a machine readable medium having stored thereon such a computer program product.

An advantage of the invention is that the power plant controller is able to adapt the maximum allowed power output from the wind turbines in dependence on the spare capacity on the transmission line arrangement. Therefore, if the wind conditions in the wind power plant are suitable, for example the wind speeds higher than the 'rated' wind speed, then one or more of the wind turbines may be configured to be allowed to produce more power than their nominal power limit settings so as to exploit the spare capacity on the transmission line. For example, if one or more wind turbines are not operating, then the other wind turbines may be allowed to produce more power to offset the shortfall of power on the transmission line arrangement.

In some embodiments, the wind turbines in the wind power plant may be configured by commanding selected ones to exceed their respective nominal power limit setting during appropriate wind conditions. This may involve transmitting a margin value to said wind turbine indicating the amount by which the nominal power limit setting may be exceeded. The margin value may be determined in different ways. For example, the margin value may be set as a fixed value in proportion to the amount of capacity on the transmission line. Alternatively, the margin value may be determined in dependence on the space capacity of the wind power plant divided by the number of wind turbines that are in an operating condition. In this way, the spare capacity is 'shared' across a number of operating wind turbines.

In other embodiments, the wind turbines may be configured by providing said wind turbines with a replacement or new nominal power limit setting. In effect therefore this would overwrite respective nominal power limit settings already stored in said wind turbines. The new nominal power limit settings may be transmitted to the wind turbines over a communications network which makes configuration of said wind turbines readily achievable.

The change in the nominal power limit settings of the wind turbines or, indeed the margin values, may be achieved by way of an iterative process. Such a process would involve changing a nominal power limit setting, or a margin value, as appropriate, monitoring the resulting change on the power output of the wind power plant, and then making further adjustments to the nominal power limit settings or margin values of the respective wind turbines.

The invention may be useful in many scenarios where the total power output of the wind power plant may be less than the sum of the rated power outputs of the all of the wind turbines in the power plant. One scenario is where some wind turbines may be operating in the wake of upstream wind turbines so that they are able to extract less energy from the wind. In circumstances where the wind speed just reaches rated wind speed, this means that the upstream wind turbines may be operating at rated power levels, whilst downstream wind turbines may be operating at sub rated power levels. Those wind turbines that are operating in the wake of upstream wind turbines may therefore benefit from having their nominal power limit settings increased so that as wind speeds increase, they are able to boost their power production. Since wind direction changes, the power plant controller may monitor the wake-effected turbines on a frequent basis to ensure that the power output of the wind power plant is optimized thereby making best use of the transmission line capacity.

The step of determining spare capacity on the transmission line arrangement may includes comparing measured power on the transmission line arrangement against a value of maximum transmission capacity on the transmission line arrangement. The maximum transmission capacity may be a fixed value, for example as determined by a transmission system operator, although it may be adjusted or offset based on environmental conditions. For example, colder conditions may accommodate higher levels of power transmission along the transmission line.

For the purposes of this disclosure, it is to be understood that the control system described herein can comprise a control unit or computational device having one or more electronic processors. Such a system may comprise a single control unit or electronic controller or alternatively different functions of the controller(s) may be embodied in, or hosted in, different control units or controllers. As used herein, the term "controller" will be understood to include both a single control unit and a plurality of control units collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, the set of instructions could be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the aspects of the invention is not intended to be limited to any particular arrangement.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

In order for the inventive concept to be better understood, specific embodiments will now be explained by way of example with reference to the accompanying drawings, in which.

DETAILED DESCRIPTION OF THE INVENTION

Figure 1:
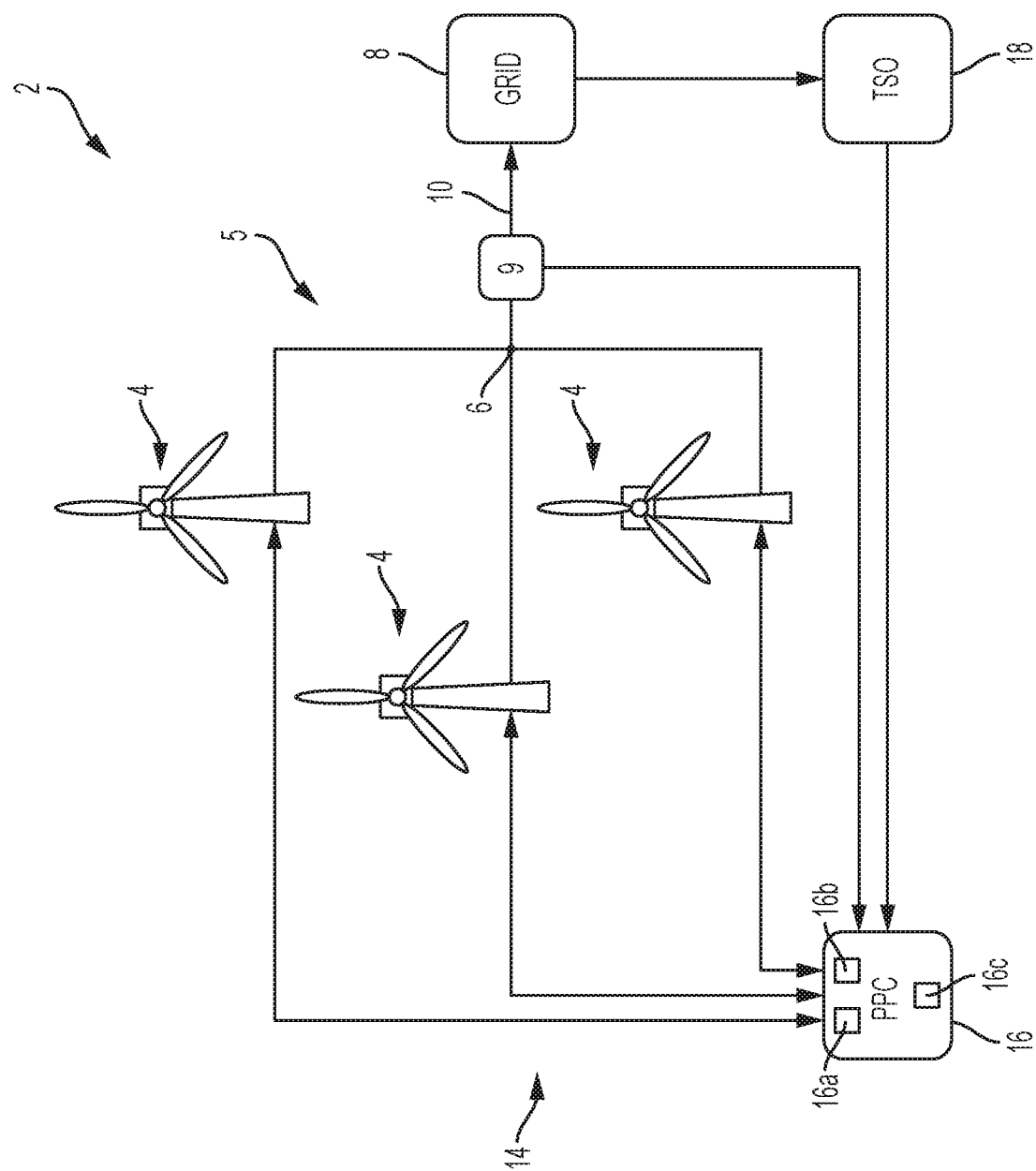
FIG. 1 is a schematic view of a wind power plant.

FIG. 1 shows the general structure of a wind power plant 2 in which the aspects of the invention may be implemented. The wind power plant 2 comprises a plurality of wind turbines systems, generators, or more simply 'wind turbines' 4. Each of the wind turbines 4 is a horizontal axis wind turbine (HAWT), although it should be appreciated that the aspects of the invention are also applicable to other types of wind turbines.

As is conventional, the power outputs of the wind turbines 4 are interconnected via an internal grid 5 at a point of common coupling 6, which feeds an external power grid 8. Note that the point of common coupling 6 may also be referred to herein as 'PCC' for brevity. Here, the PCC is shown as separate from a substation 9, but in practice the PCC could be embodied at the substation 9. The power grid 8 therefore receives power from the wind power plant 2 via a transmission line arrangement or 'feeder line' 10 that is a combination of the outputs from all of the wind turbines 4 in the power plant 2, as stepped up by the substation 9 to a voltage that is suitable for onward transmission. It will be appreciated that the electrical power generated by the wind turbines 4 depends on the wind energy available in the locality of each of those wind turbines 4, since the wind speed typically varies from location to location across the power plant 2.

The wind turbines 4 form part of an industrial control system and, as such, are connected together by a communications network 14. The communications network 14 enables each of the wind turbines 4 to communicate bi-directionally with a power plant control system or 'controller' (PPC) 16. Such a communications network 14 is conventional in wind power plants 2 featuring modern utility-scale wind turbines 4 so a detailed explanation will not be given here. However, it should be understood that the communications network 14 enables the wind turbines 4 to feed operational data to the power plant controller 16, and, importantly, enables the power plant controller 16 to transmit control commands and other data to each of the wind turbines 4, either on a basis of general broadcast transmissions (same data for all wind turbines 4) or directed transmissions (commands/data tailored to specific wind turbines 4). Although FIG. 1 only shows three wind turbines for convenience, in practice such a power plant would usually include many more wind turbines.

In the embodiment of FIG. 1, the communications network 14 is depicted as lines, which suggests a cable-based infrastructure. Although a cable-based infrastructure is acceptable, it should be noted that this is not to be considered limiting and, as such, the communications network 14 may be embodied as a wireless system. Typically, communications protocols for such control systems are standardized by equipment vendors, examples of which are governed by IEC 60870-5-101 or 104, IEC 61850 and DNP3. However, alternative protocols such as TCP/IP may also be used.

Figure 2:
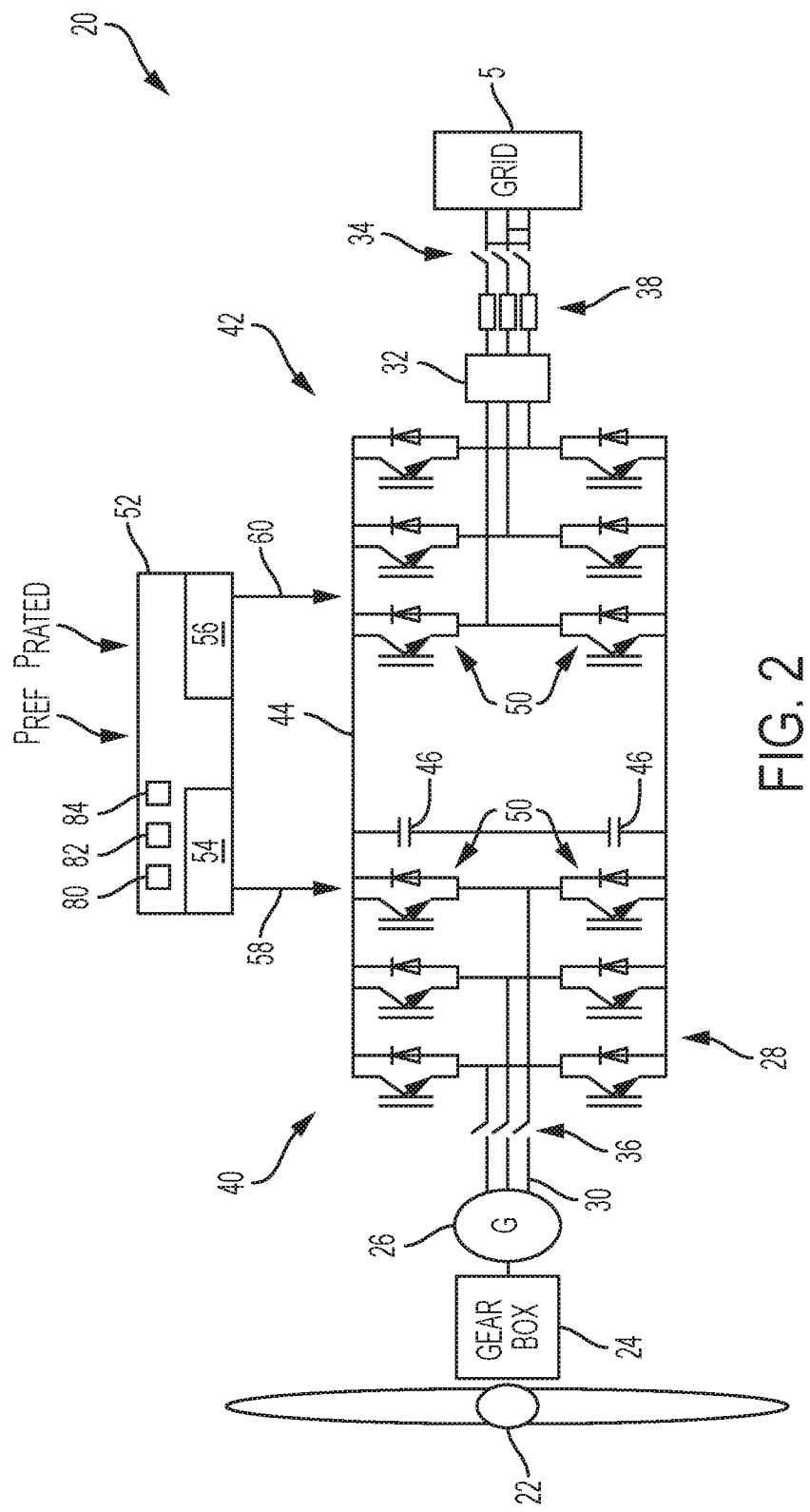
FIG. 2 is a schematic systems architecture view of a wind turbine generation system included in the wind power plant.

Having described the overall arrangement of the wind power plant 2, the following description will now focus on the more detailed structure of the wind turbines 4 for completeness. For the purposes of this description, all of the wind turbines 4 can be considered to be substantially identical although it will be appreciated that this is not essential. With this in mind, FIG. 2 shows an example of a wind turbine system 20 which gives context to the illustrated embodiments of the invention, as will become apparent. It will be noted that Figure depicts the major functional components of the wind turbine, though other conventional features are not shown here for brevity, for example yaw control equipment, control network, local power distribution network and so on. However, the skilled person would understand that these features would be present in a practical implementation. Also it should be noted that the specific architecture discussed here is used as an example, and so other architectures are possible.

With reference to FIG. 2, the wind turbine system 20 includes a bladed rotor 22, which drives a transmission 24. Although the transmission 24 is shown here in the form of a gearbox, direct-drive architectures are known which do not include a gearbox. The transmission 24 drives an electrical generator 26 for generating electrical power. Three-phase electrical power generation is usual in utility scale wind turbine systems, but this is not essential for the purpose of this discussion.

The electrical generator 26 is connected to a power converter system 28 by a suitable three-phase electrical connector such as a cable or bus 30. The power converter system 28 may be of a conventional architecture and, as is known, converts the output frequency of the electrical generator 26 (an AC signal) to a suitable output voltage level and frequency (also an AC signal) that is suitable for supplying to the internal electrical grid 5 via a transformer 32. A first (grid-side) breaker arrangement 34 is located between the power converter system 28 and the grid 5 in order to control connection of the converter 28 to the grid 5, and a second (generator-side) breaker arrangement 36 is located between the electrical generator 26 and the power converter system 28 to control connection of the electrical generator 26 to the power converter system 28.

A grid choke 38 is located between the power converter system 28 and the grid-side breaker arrangement 34 to remove high frequency switching characteristics from the voltage waveform output by the transformer 32.

It will be appreciated that the specific architecture described here is a two-level back-to-back voltage source full scale power converter (FSC) system 28, which includes a generator-side converter 40 and a grid-side converter 42 which are coupled via a DC-link 44. The DC-link 44 comprises capacitors 46 which act to smooth out the voltage ripple in the output of the generator-side converter 40.

As is conventional, the generator-side converter 40 and the grid-side converter 42 comprise a plurality of semiconductor switches 50, which in this case are insulated gate bipolar transistors (IGBTs), but other switching devices may be used. In this embodiment, the converters 40, 42 comprise six semiconductor switches 50 but other full-scale converter configurations would be understood by the skilled person. Together, the generator-side converter 40 and the grid-side converter 42 are responsible for converting one or more AC voltage signals to a DC voltage signal and then to convert the DC voltage signal back again to one or more AC voltage signals. More specifically, the AC voltage signal(s) from the electrical generator 26 are converted by the generator-side converter to a DC voltage signal on the DC link, which is then converted by the grid-side converter back to an AC voltage signal(s).

In order to achieve power control objectives, the wind turbine system 20 is equipped with a wind turbine control system, or more simply 'controller' 52 that is operable to control the power converter system 28 appropriately. The wind turbine controller 52 may be implemented in any combination of hardware, software and/or firmware to provide a suitable processor 80, memory module 82 and input/output system 84. The processor 80 may be configured to carry out a set of program code instructions stored on the memory module.

As part of this, the wind turbine controller 52 includes a generator-side converter drive module 54 and a grid-side converter drive module 56. Here the drive modules 54, 56 are shown as being integrated into the wind turbine controller 52, but it should be noted that the drive modules 54, 56 may also be separate hardware units. The wind turbine controller 52 is also responsible for issuing control commands to other parts of the system, for example the pre-charge unit 48 and the grid-side and generator-side breaker arrangements 34, 36.

The generator-side converter drive module 54 provides suitable drive signals 58 to the control gates of the semiconductor switches 50 of the generator-side converter 40 in order to convert the alternating voltage generated by the electrical generator 26 to a substantially constant voltage on the DC-link 44 at a predetermined voltage level.

Similarly, the grid-side converter drive module 56 provides suitable drive signals 60 to the control gates of the semiconductor switches 50 of the grid-side converter 42 in order to convert the substantially constant voltage on the DC-link 44 to an alternating voltage at a predetermined voltage level and frequency.

As would be known to the skilled person, the drive signals 58, 60 sent to the generator-side converter 40 and the grid-side converter 42 may be any suitable drive signal, one example of which is a pulse-width modulated (PWM) drive signal, but other drive signal types could also be used. The drive signals 58, 60 may be enabled by the respective converter drive modules 54, 56 in order to transfer energy across the associated converter 40, 42. Likewise, the drive signals 58, 60 may be disabled by the respective converter drive modules 54, 56 in order to prevent the transfer of energy across the associated converter 40, 42.

Figure 3:
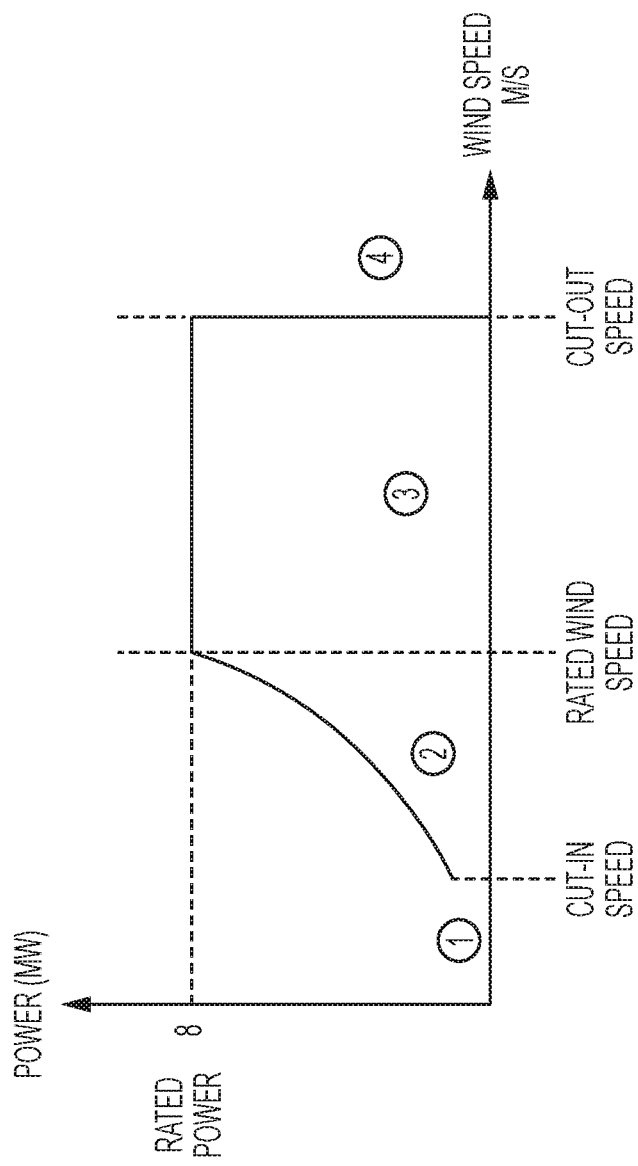
FIG. 3 is a chart illustrating a typical power curve relating wind speed to generated power.

The wind turbine system 20 described above operates to generate power from a range of wind speeds, and FIG. 3 shows a typical operational envelope commonly referred to as a power curve which defines the power that may be generated by the converter system of the wind turbine for a given wind speed. As would be known by the skilled person, very low wind speeds product insufficient torque on the wind turbine rotor to generate usable energy so the generator does not operate, as is shown in Region 1. However, as wind speeds increase, a point is reached at which the wind turbine is able to produce power, and this is referred to as the cut-in speed, usually being around 3 or 4 m/s.

When wind speeds are above the cut-in speed, though not high enough to produce maximum power, the wind turbine operates to maximize the aerodynamic efficiency of the rotor to capture as much energy as possible from the wind. This is shown at Region 2 and during this region of operation it is usually the case that the speed of the wind turbine is controlled using generator torque so as to keep the tip speed ratio at an optimum point for energy extraction.

At elevated wind speeds high enough for the wind turbine to produce its maximum or 'rated' power, usually being around 10 m/s to 14 m/s depending on the wind turbine, the control objective is to regulate blade pitch and generator torque so that the nominal maximum power limit setting is not exceeded. This is shown at Region 3 on FIG. 3. This nominal power limit setting may in principle be any power output value which is determined that the wind turbine must not exceed under a set of predefined operating conditions. The limit setting is sometimes referred to as the 'rated power output' and the wind speed at which it is reached is called the rated wind speed. At higher wind speeds, the design of the turbine is arranged to limit the power to this maximum level and there is no further rise in the output power. As is known, the rated power or 'power rating' is a limit that is defined by the equipment manufacturer stipulating a predetermined level of operation under which the equipment will not be damaged under continuous use while allowing for a certain safety margin. It is sometimes also referred to as 'maximum continuous power rating'.

As the wind speed increases above the rated wind speed, the forces on the turbine structure continue to rise and so, to avoid damage occurring, the system is designed to shut down the wind turbine at unsafe wind speeds. This is called the cut-out speed and is shown in Region 4 on FIG. 3.

Within the power generation constraints imposed by the power curve, as described above, an important function of the power plant controller 16 is to provide each of the wind turbines 4 with power reference values which dictate the active power and reactive power which the wind turbines are required to produce under the current operating conditions, referred to by the variables $P_{REF}$ and $Q_{REF}$. This enables a power plant controller to control the output of its wind turbines in order to achieve certain objectives, for example to support the stability of the grid by increasing or decreasing active and reactive power supply. In turn, the wind turbine controller 52 determines suitable control parameters with which to apply to the various subsystems in order to meet the desired power output.

The power plant controller 16 determines $P_{REF}$ and $Q_{REF}$ based on several factors, including: the operational status of the wind turbines 4, the grid status, and the power demand as provided by a transmission system operator (TSO), labelled in FIG. 1 as 18. Overall, the power plant controller 16 will operate the wind turbines 4 so that the power produced by the wind power plant 2 as a whole meets the power demanded by the TSO 18, but does not exceed the maximum power that the collective wind turbines can produce. As is known in the art, the maximum permitted power output of a wind turbine is referred to as the 'rated' power and is designed as being the maximum continuous power output that a wind turbine can sustain whilst meeting its projected operational lifetime, which is usually 25 years. In doing so, the power plant controller 16 determines specific power reference values in respect of each of the wind turbines 4 in the wind power plant 2. This ensures that power production from the wind power plant 2 can be optimized to take account of varying conditions so as to support grid stability for example.

The power plant controller 16 may also command the wind turbines 4 to transition between an operating state, in which the wind turbines 4 generate power, and a non-operating state, in which the wind turbines 4 do not generate power, which may be necessary in cases of excessively high wind, or for maintenance purposes.

It should be appreciated that the power plant controller 16 may be implemented in any combination of hardware, software and/or firmware to provide a suitable processor 16a, memory module 16 and input/output system 16c, shown here schematically. The processor 16a may be configured to carry out a set of program code instructions stored on the memory module which may implement a method as described herein, and as will become apparent in the foregoing description.

Returning to FIG. 1, generally wind power plants are designed so that the power production capacity, that is to say, the cumulative rated power of all of the wind turbines in the wind power plant, comply with the power transmission limit on the transmission line arrangement 10. For example, if the transmission line arrangement 10 had a power transmission limit of 400 MW, then the wind power plant 2 may include twenty wind turbines each having a rated power of 8 MW. It should be appreciated here that line losses and transformer losses are not considered here for convenience. It should also be appreciated that adjustments may be made to take into account the effect of environmental conditions on the capacity of the transmission line arrangement.

However, it may be the case that the total power output of the wind power plant does not meet the transmission line limit. For example, if one or more of the wind turbines in the power plant is not operating, due to a maintenance issue, for example, there will be excess capacity on the transmission line even if all of the other wind turbines in the power plant are operating at their rated power levels. In the example given above, if out of a total of twenty wind turbines operating at rated power, two wind turbines have been shut down, then the total power production will be approximately 384 MW. It will be appreciated therefore that the transmission line will be underutilized.

The inventors have recognized that there is an opportunity to better utilize the transmission line by determining the extra capacity on the transmission line arrangement 10 and configuring the rated power setting of the wind turbines in dependence on that determined capacity.

Figure 4:
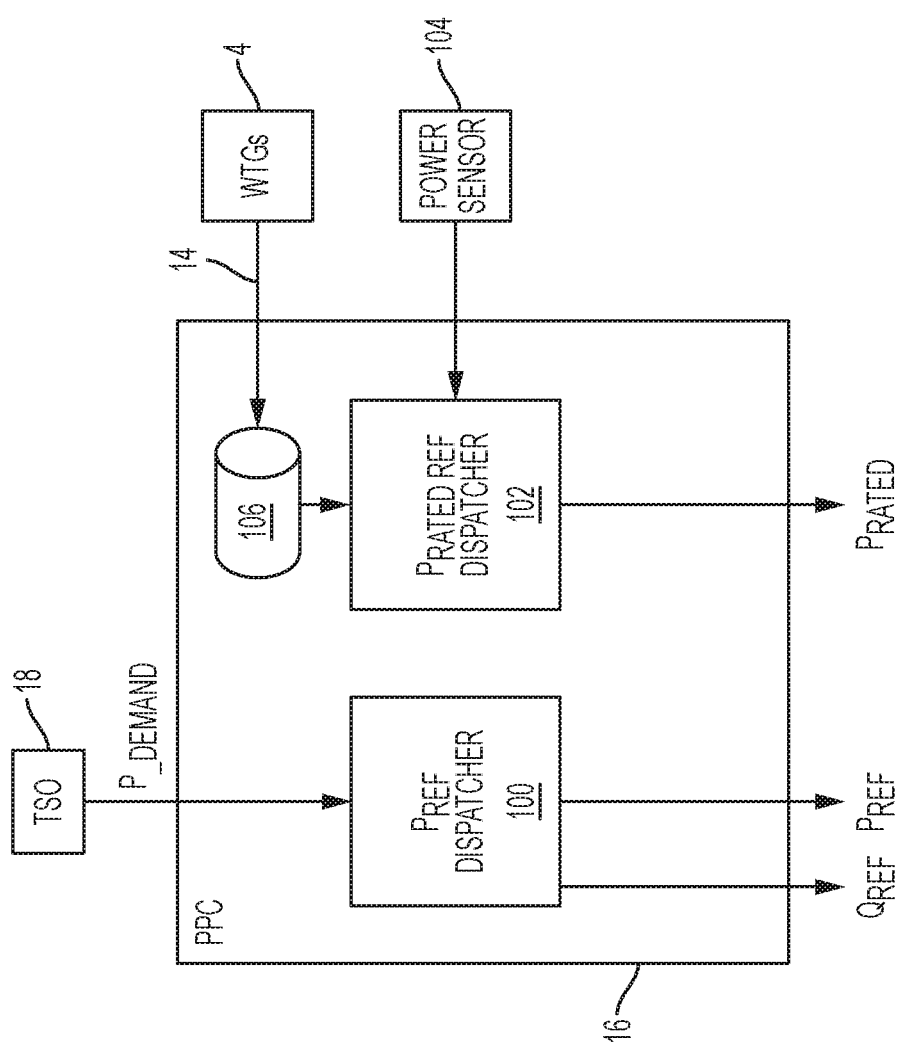
FIG. 4 is a block diagram of a power plant controller of the wind power plant.

Such functionality is implemented in the power plant controller 16, as will now be described with reference to FIGS. 4 and 5. In addition to the power reference values transmitted to the wind turbines, in this embodiment the power plant controller 16 is also operable to configure one or more of the wind turbines in the power plant in dependence on the determined space capacity such that selected wind turbines are operable to exceed their respective rated power setting in order to exploit the space capacity on the transmission line. This may be achieved in various ways. For example, the power plant controller may be operable to command one or more of the wind turbines to exceed their pre-programmed rated power setting. Such a command may include a margin or percentage which instructs the wind turbine the extent to which the rated power setting may be exceeded. For example, such a command may instruct a respective wind turbine that it may, if the wind conditions are appropriate, exceeds its rated power setting by 0.5%, or 1%. It should be appreciated that any margin value would be possible, in principle, but in practice the margins are likely to be relatively small, for example less than 5%, and restricted by an absolute peak power output capability of the generating equipment of the wind turbine. The margin value may be determined in various ways, but it is envisaged that one effective technique would be to 'share' the spare capacity across the currently operating wind turbines by dividing the spare capacity by the number of wind turbines that are in an operating condition.

In other embodiments, the wind turbines may be configured by effectively overwriting their respective stored rated power settings (e.g. $P_{RATED}$) with new settings that are transmitted to the wind turbines over the communications network 14

A specific example will now be described with reference to FIG. 4. Here it should be appreciated that the functionality of the power plant controller 16 has been simplified for present purposes to show only that functionality that is relevant for an understanding of the invention. In practice, a power plant controller 16 would have other control responsibilities, such as controlling power compensation equipment, but these will not be discussed here for simplicity.

The power plant controller 16 according to this embodiment of the invention has first and second dispatch modules or 'dispatchers'. A first dispatch module 100 is responsible for communicated the power reference values $P_{REF}$ and $Q_{REF}$ to each of the wind turbines 4 in the power plant 2 in response to a power demand $P_{DEMAND}$ from the TSO 18. Such functionality is known. A second dispatch module 102 is responsible for outputting rated power levels $P_{RATED}$ to each of the wind turbines 4. Note that the value of $P_{RATED}$ may be the same for all wind turbines 4 or may be configured specifically for each individual wind turbine 4. Also to be noted is that the rated power level may also be referred to as a nominal power limit setting.

The values of $P_{RATED}$ may be determined in dependence on the spare capacity of the transmission line arrangement. In order to calculate this spare capacity, the second dispatch module 102 receives a measurement of the power that is currently being generated by the wind power plant and thus transmitted along the transmission line. The power measurement is provided by a suitable power sensor 104. The power sensor 104 may be associated with the transmission line arrangement before or after the substation 9. It is currently preferred that the power sensor 104 is configured for measuring active power, although it may also be configured to determine apparent power. In order to take into account short term variations of the power measurement, the power sensor 104 make include appropriate low pass filtering to ensure that the measured power does not trigger unnecessary changes to the rated power settings.

The second dispatch module 102 also has access to a database 106 of current rated power levels for all of the wind turbines 4 within the wind power plant 2. It is therefore able to keep track of the rated power levels of each turbine and make incremental adjustments thereto. The database 106 may be updated by receiving data relating to the rated power levels from the wind turbines 4 over the communications network 14. In addition to containing information relating to the rated power of each of the wind turbines 4, the database 106 may also receive and store information relating to the operational status of the wind turbines.

Figure 5:
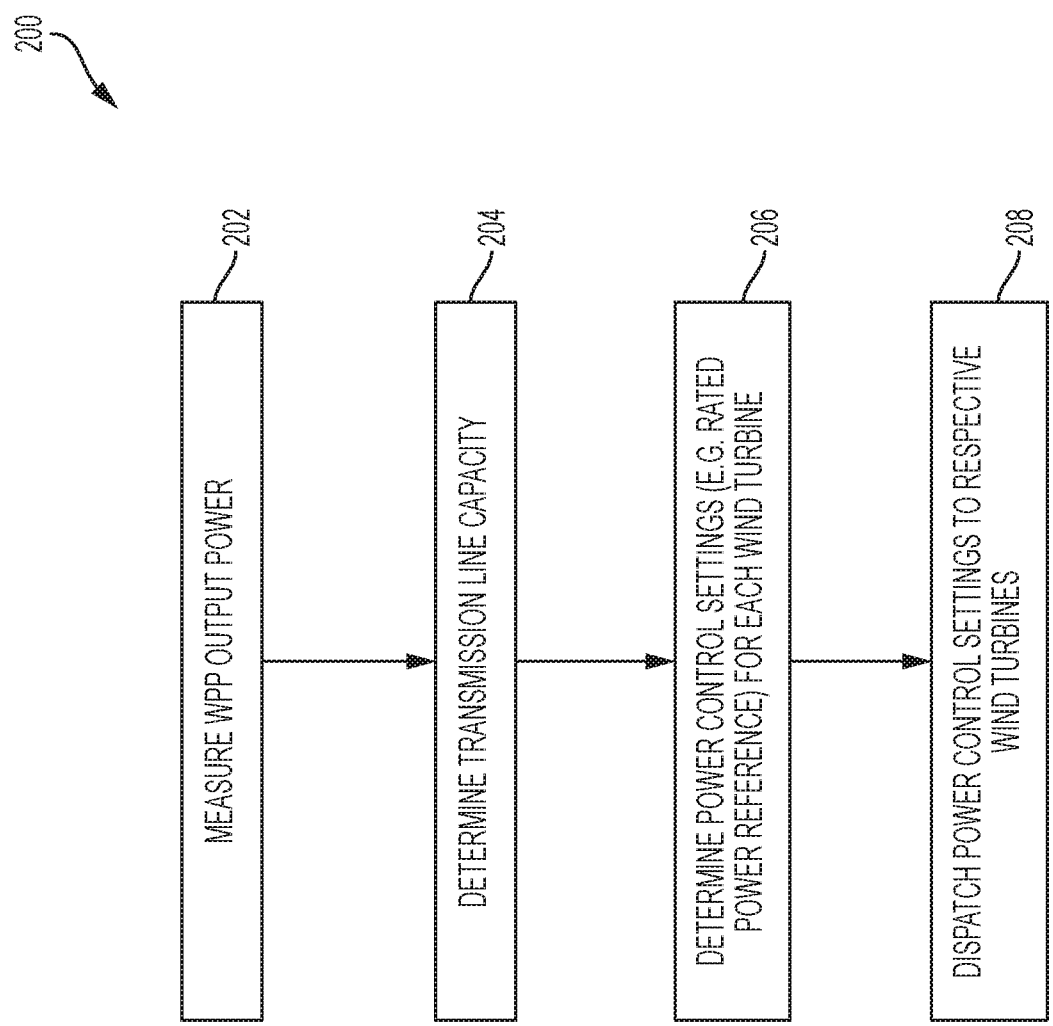
FIG. 5 is a flow chart of a method of controlling the wind power plant according to an embodiment if the invention.

With reference also to FIG. 5, the power plant controller 16 may perform the following process 200 repeatedly. Such functionality is not essential to be performed at a high rate so currently it is envisaged that a repeat period of approximately 10 seconds would be appropriate, although this is just an example.

Firstly, at block 202 the output power on the transmission line arrangement 10 is measured. As has been mentioned, preferably the measurement evaluates the active power in MW that is being transmitted along the transmission line arrangement 10. Once the output power has been measured, the spare capacity on the transmission line arrangement is determined at block 204 by comparing the measured output power with the maximum power limit for the transmission line arrangement. The maximum power limit may be a static value that is configured as part of the design process for the wind power plant as the maximum power that may be handled by the transmission line arrangement 10 and the substation 9. Nominally, the maximum power limit can be considered to be the sum of the rated power levels of all of the wind turbines 4 in the power plant 2. The spare capacity on the transmission line arrangement 10 can therefore be determined by subtracting the measured power from the known maximum power limit.

Once the transmission line capacity has been calculated, the power plant controller 16 may then determine the rated power setting for each wind turbine 4 in the power plant 2, as referenced at block 206. Once the rated power levels have been determined they are then dispatched to the wind turbines 4 at block 208. In response to this, the wind turbines would implement the revised rated power setting, thereby in effect adjusting their respective power curves. With this approach, the revised or new rated power setting will overwrite the existing rated power setting stored within the control system of the wind turbine. However, alternative embodiments are envisaged where instead of overwriting the existing rated power setting, selected ones of the wind turbines 4 may be instructed or commanded that they may exceed their respective rated power settings in appreciate conditions, for example when wind speeds are in excess of rated wind speed. Moreover, those wind turbines may be provided with a margin, for example a percentage value, of the amount by which they may exceed their stored rated power setting.

It should be appreciated that the way in which the power plant controller 16 determines the rated power setting for each of the wind turbines may be achieved in many ways, and some examples will now be discussed.

In the aforementioned example of a wind power plant having a total of twenty wind turbines, each of those may have a nominal rated power of 8 MW. Thus, this can be considered to be the 'default' rated power setting when the wind power plant is commissioned. The database 106 of the power plant controller 16 would therefore associate each wind turbine with a rated power setting of 8 MW.

From these initial conditions, consider the situation where one wind turbine needs to be shut down due to a maintenance requirement. In such a case, even if there were strong wind conditions meaning that all of the other wind turbines were operating at their rated power levels, the total power output of the wind power plant would still be below the maximum capacity of the transmission line. The power plant controller 16 in accordance with the invention is operable to detect this capacity shortfall and will transmit to the wind turbines an increased rated power setting so that the transmission line capacity can be utilized more effectively. For example, the wind turbines that are in operation may be commanded to revise their rated power setting to 8.1 MW instead of 8.0 MW. It will be appreciated that this is an example only and the exact rated power setting increment or, indeed, decrement, may depend on other factors such as absolute maximum power output of the wind turbine, temperature conditions, generator and converter performance and so on.

The rated power levels may be increased (or decreased) by a predetermined increment size. For example, an 'initial' rated power level of 8.0 MW may be increased by increments of 0.1 MW, up to a certain maximum level, for example 8.5 MW. These values are given by way of example only and will be different for different wind turbines.

The rated power settings of the wind turbines may be incremented according to various rules. For example, the power plant controller 16 may be configured to increase only a certain number of wind turbines, or only those wind turbines located in certain positions in the wind power plant. Alternatively, the power plant controller 16 may be configured to increment the rated power settings of all of the wind turbines by an equal amount, or increase the rated power settings of a first group of the wind turbines by a predetermined amount, allow a settling period to establish the effect of the increased rated power settings, and then increase the rated power settings of subsequent groups of the wind turbines.

In an alternative embodiment, the spare capacity of the transmission line may be divided between the operational wind turbines in the power plant whose power rating settings may be increased accordingly.

In larger wind power plants (for example including 50 or more wind turbines) it will in theory be possible to increment the rated power levels of the wind turbines so that the power output of the wind power plant remains near to the maximum transmission line capacity for an increased amount of time.

The ability of the power plant controller 16 to configure the rated power settings of the wind turbines means that it can improve the overall efficiency of the wind power plant. For example, consider the situation where the wind power plant is operating in strong wind conditions so that it in principle possible for the wind turbines to operate at their nominal rated power levels, that is to say wind speeds just reaching Region 3 on the power curve in FIG. 3. In such circumstances, the wind turbines in an upstream position relative to the approaching flow of wind will be able to generate electricity at their rated power level. However, wind turbines that are in a downstream flow of air will be affected by the wake of the upstream wind turbines and therefore may not be able to operate at rated power. This will manifest as an underutilization of the transmission line capacity. In such a case, the power plant controller 16 is operable to detect the spare capacity on the transmission line and increase the rated power levels of downstream turbines. Therefore, the downstream wind turbines are able to take advantage higher wind speeds to generate power that is above their nominal or 'initial' rated power setting.

Suitably, if the power plant controller 16 detects that the total power output of the power plant is approaching the maximum limit of the transmission line, then it may be operable to decrement the rated power settings of the wind turbines by transmitting reduced rated power settings to them over the communications system.

The skilled person will appreciate that various modifications may be made to the specific embodiments described above without departing from the inventive concept as defined in the claims.

In the above discussion, the main functionality is where the power plant controller determines that there is positive spare capacity on the transmission line arrangement and, in response, adjusts the rated power settings of one or more of the wind turbines in the power plant in order reduce that spare capacity. However, it is also envisaged that the power plant controller would be operable to reduce the rated power settings of one or more of the wind turbines in the power plant if it determines that there is negative spare capacity on the transmission line arrangement. For example, this might occur where the rated power settings are such that they total rated power generation of the wind power plant is greater than the allowed capacity of the transmission line arrangement and the substation.

The invention claimed is:

1. A method of controlling a wind power plant including a plurality of wind turbines that provide an output power through a transmission line arrangement, wherein each wind turbine in the wind power plant has a nominal power limit setting, wherein the method comprises:
   determining a spare capacity of the transmission line arrangement, wherein determining the spare capacity of the transmission line arrangement comprises comparing a measured power on the transmission line arrangement against a value of maximum transmission capacity of the transmission line arrangement; and
   configuring one or more wind turbines of the wind power plant to exceed the respective nominal power limit setting to increase the output power to within the spare capacity of the transmission line arrangement.

2. The method of claim 1, wherein configuring the one or more wind turbines comprises:
   commanding selected ones of the one or more wind turbines to exceed their respective nominal power limit setting during appropriate wind conditions.

3. The method of claim 2, wherein commanding the selected ones of the one or more wind turbines comprises:
   transmitting a margin value to the selected ones of the one or more wind turbines, the margin value indicating the amount by which the respective nominal power limit setting may be exceeded.

4. The method of claim 3, wherein the margin value is determined as the spare capacity of the transmission line arrangement divided by a number of wind turbines of the wind power plant that are in an operating condition.

5. The method of claim 1, wherein configuring the one or more wind turbines comprises:
   providing a new nominal power limit setting to each wind turbine of the one or more wind turbines.

6. The method of claim 5, wherein providing the new nominal power limit setting comprises:
   transmitting the new nominal power limit setting over a communication network.

7. The method of claim 5, wherein providing the new nominal power limit setting comprises:
   providing a plurality of new nominal power limit settings using an iterative process.

8. The method of claim 5, wherein the new nominal power setting limit is calculated as the spare capacity of the transmission live arrangement divided by a number of wind turbines of the wind power plant that are in an operating condition.

9. The method of claim 5, wherein configuring the one or more wind turbines comprises:
   identifying one or more wind turbines of the wind power plant that are affected by wakes of one or more other wind turbines of the wind power plant; and
   providing new nominal power limit setting values to one or more of the identified one or more wind turbines.

10. The method of claim 1, wherein the nominal power limit setting of the wind turbines is a rated power setting.

11. The method of claim 1, wherein the maximum transmission capacity varies with environmental conditions.

12. The method of claim 1, wherein the measured power is at least one of measured apparent power, measured active power, or measured reactive power.

13. The method of claim 1, wherein the measured power on the transmission line is filtered to account for short-term variations in power production.

14. A power plant controller comprising at least a processor, a memory module, and an input/output system, and wherein the memory module includes a set of program code instructions which when executed by the processor, implements an operation of controlling a wind power plant including a plurality of wind turbines that provide an output power through a transmission line arrangement, wherein each wind turbine in the wind power plant has a nominal power limit setting, the operation comprising:
- determining a spare capacity of the transmission line arrangement, wherein determining the spare capacity of the transmission line arrangement comprises comparing a measured power on the transmission line arrangement against a value of maximum transmission capacity of the transmission line arrangement; and
- configuring one or more wind turbines of the wind power plant to exceed the respective nominal power limit setting to increase the output power to within the spare capacity of the transmission line arrangement.

15. The power plant controller of claim 14, wherein the input/output system is coupled to the plurality of wind turbines.

16. The power plant controller of claim 14, wherein configuring the one or more wind turbines comprises:
- commanding selected ones of the one or more wind turbines to exceed their respective nominal power limit setting during appropriate wind conditions.

17. The power plant controller of claim 16, wherein commanding the selected ones of the one or more wind turbines comprises:
- transmitting a margin value to the selected ones of the one or more wind turbines, the margin value indicating the amount by which the respective nominal power limit setting may be exceeded.

18. The power plant controller of claim 17, wherein the margin value is determined as the spare capacity of the transmission line arrangement divided by a number of wind turbines of the wind power plant that are in an operating condition.

19. A computer program product stored on a machine readable medium, the computer program product comprising program code instructions for implementing an operation of controlling a wind power plant including a plurality of wind turbines that provide an output power through a transmission line arrangement, wherein each wind turbine in the wind power plant has a nominal power limit setting, the operation comprising:
- determining a spare capacity of the transmission line arrangement, wherein determining the spare capacity of the transmission line arrangement comprises comparing a measured power on the transmission line arrangement against a value of maximum transmission capacity of the transmission line arrangement; and
- configuring one or more wind turbines of the wind power plant to exceed the respective nominal power limit setting to increase the output power to within the spare capacity of the transmission line arrangement.

* * * * *